United States Patent Office 3,134,068
Patented May 19, 1964

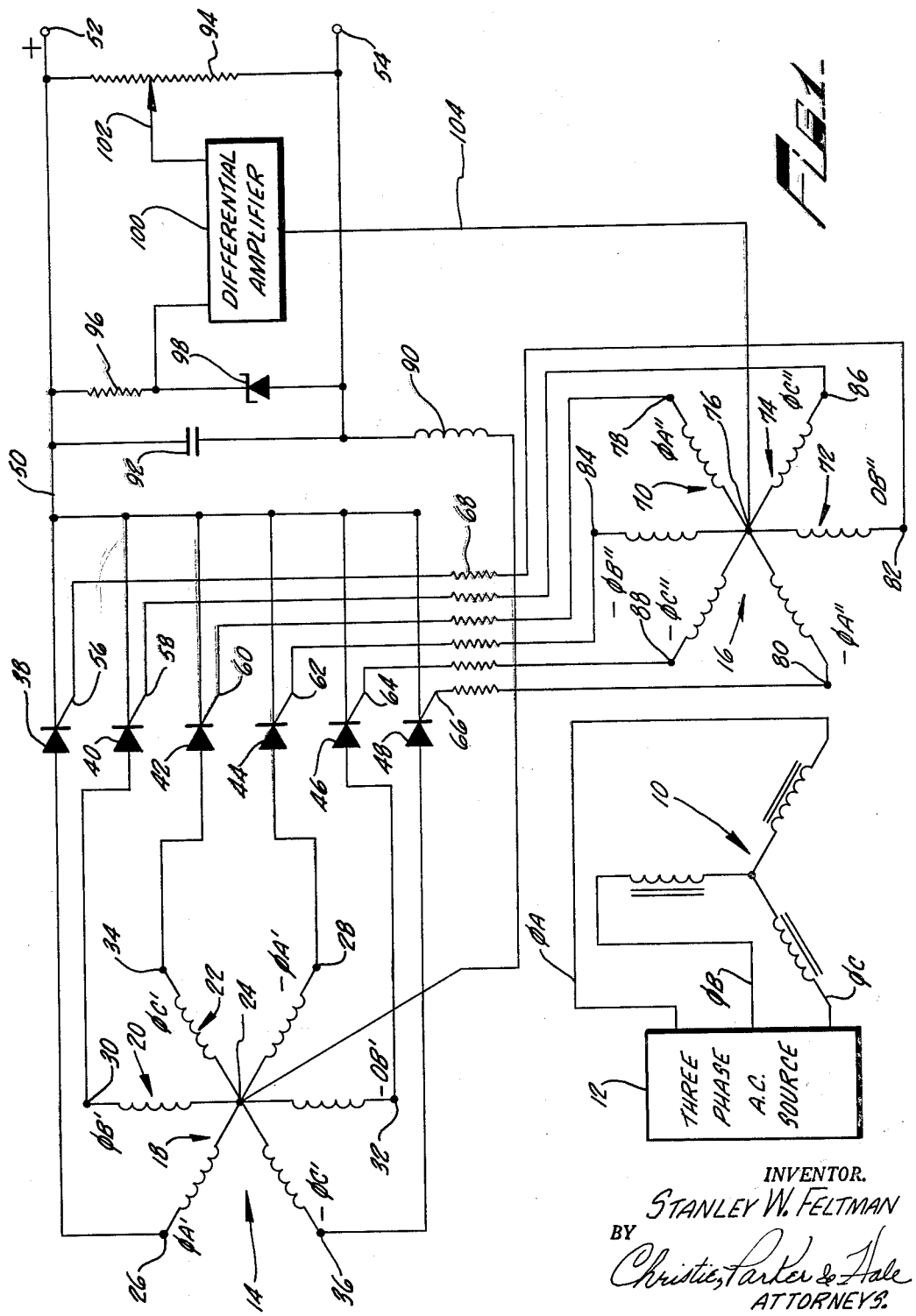

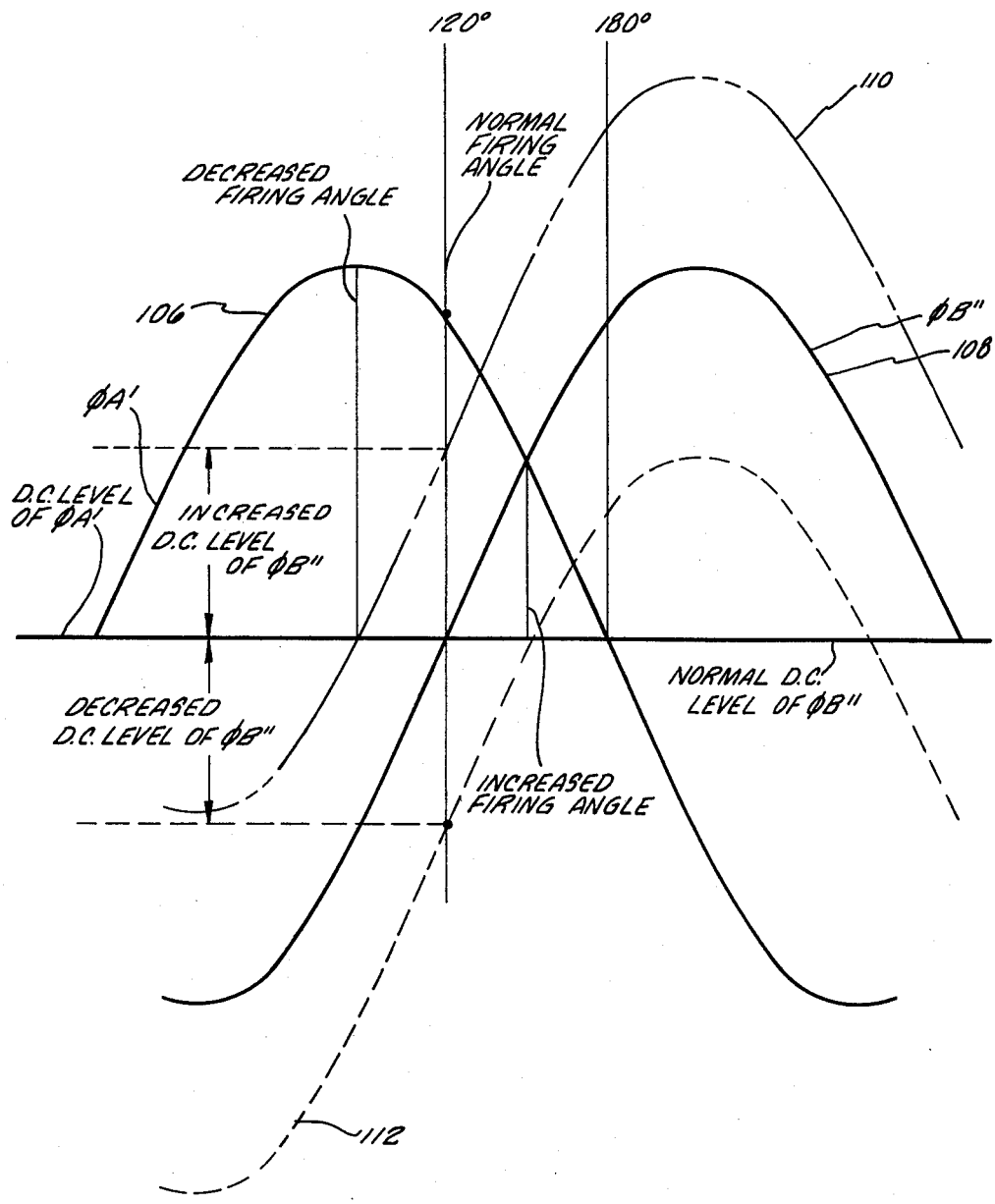

3,134,068
POWER SUPPLY FOR DEVELOPING A REGULATED DIRECT CURRENT SIGNAL FROM A THREE-PHASE SUPPLY
Stanley W. Feltman, West Covina, Calif., assignor to Consolidated Electrodynamics Corporation, Pasadena, Calif., a corporation of California
Filed Oct. 23, 1961, Ser. No. 146,874
8 Claims. (Cl. 321—18)

This invention is directed to an improved power supply for developing a regulated direct current signal from a three-phase alternating current supply.

Systems for developing a regulated direct current signal from a three-phase alternating current supply are well known. Generally such systems include a three-phase transformer arrangement in which each coil of a secondary winding is coupled to a discharge tube having a regulated firing angle. In response to a three-phase signal applied to the three-phase transformer the discharge tubes are fired in sequence to develop a regulated direct current output signal. To maintain a relatively stable magnitude of output signals with variations in load and source conditions such prior art type of regulated power supplies require three separate phase-controlling networks coupled between the individual coils of the three-phase transformer secondary winding and the individual discharge tubes.

The present invention, on the other hand, provides a regulated power supply utilizing a single closed loop error detector circuit for simultaneously controlling all phases of a three-phase or multiple three-phase system to develop a direct current voltage, the average value of which is maintained with varying load and signal source conditions.

To accomplish this a basic form of the power supply of the present invention for use in a three-phase system includes an unregulated source of three-phase alternating current signals and first and second means, each including a plurality of windings for developing a current signal in each winding which is in phase with a current signal of the three-phase signal source. The second means includes a common winding connection point. A voltage signal applied to the common winding connection point controls the direct current level of the current signals developed in each winding of the second means. Each winding of the first means is coupled to a normally open electrical switching device. Each electrical switching device is coupled to an output terminal and includes a control electrode for controlling the closing of the switching device. The control electrode of each switching device is coupled to a winding of the second means which conducts a current that is 120° out-of-phase with the current flowing in the winding of the first means coupled to the switching device. Also coupled to the output terminal is means for developing a reference voltage. The reference voltage is continuously compared with an output voltage developed at the output terminal by means which develops an error signal proportional to any difference between the reference and output voltage. The error signal is applied to the common connection point of the secondary means to control the direct current level of the current signals applied to the control electrodes of the switching devices.

In this manner the normally open switching devices are closed and opened in sequence in response to control signals developed in the windings of the second means to define a 120° firing angle for each switching device. In response to the sequential operation of the switching devices a regulated direct current voltage signal is developed at the output terminals. If, in response to variation in load or source conditions, the magnitude of the output voltage signal varies relative to the reference voltage level an error signal is developed at the common winding connection point of the second means. The error signal produces a change in the direct current level of each alternating current control signal to simultaneously adjust the firing angle of each switching device such as to compensate for the variation in the output voltage level.

Thus, by use of a single closed loop error detector circuit all phases of the three-phase alternating current system are simultaneously controlled to maintain the magnitude of the direct voltage signal developed by the power supply.

For a more complete understanding of the above described power supply, reference should be made to the following detailed description which is to be considered with the drawings, in which:

FIGURE 1 is a schematic representation of a preferred embodiment of the regulated power supply of the present invention; and FIGURE 2 is a graphical representation of the waveforms associated with a single phase of the regulated power supply illustrating the control features of the present invention.

Referring to the drawings, FIGURE 1 represents a preferred form of the present invention and illustrates a three-phase full wave or six-phase half wave regulated power supply system. As represented, by way of example, the power supply includes a transformer arrangement having a Y-connected three-phase primary winding arrangement represented generally at 10. The primary arrangement 10 is coupled to a source of unregulated three-phase alternating current signals 12. The source 12 develops three single-phase signals $\phi A$, $\phi B$ and $\phi C$ which are phase displaced from each other by 120°.

The transformer arrangement also includes a pair of three-phase secondary winding arrangements represented at 14 and 16 respectively. The three-phase secondary winding arrangement 14 includes three coils 18, 20 and 22 which are center-tapped at a common junction point or neutral reference terminal represented at 24. Accordingly, as illustrated, the current signal ($\phi A'$) developed in the coil 18 between the terminal 24 and the terminal 26 is in phase with the signal $\phi A$ while the signal ($-\phi A'$) developed within the coil 18 between the junction 24 and a terminal 28 is 180° out-of-phase with the signal $\phi A$. In a like manner a signal ($\phi B'$) developed in the coil 20 between the junction 24 and a terminal 30 is in phase with the signal $\phi B$ while a signal ($-\phi B'$) developed in the coil 20 between the junction 24 and a terminal 32 is 180° out-of-phase with the signal $\phi B$. Similarly, the signal ($\phi C'$) developed in the coil 22 between the junction 24 and a terminal 34 is in phase with the signal $\phi C$ while that ($-\phi C'$) developed in the coil 22 between the junction 24 and a terminal 36 is 180° out-of-phase with the signal $\phi C$. Thus, current signals are developed in the winding arrangement 14 which are in phase and 180° out-of-phase with each current signal of the three-phase supply 10. In this manner a multiple of three-phase current signals, i.e. six-phase current signals, are developed in the winding arrangement 14.

To provide means for developing a three-phase, full wave or six-phase, half wave regulated output signal from the secondary arrangement 14, the power supply includes a plurality of electrical switching devices, one coupled to each terminal of the secondary winding arrangement 14. By way of example only, the electrical switching devices are represented as being silicon controlled rectifiers 38, 40, 42, 44, 46 and 48. The controlled rectifiers have their anodes coupled respectively to the terminals 26, 30, 34, 28, 32 and 36 of the secondary winding arrangement 14. As represented, the cathode of each controlled rectifier is coupled in common by a lead 50 to a first output terminal 52 for the power supply. In this manner each controlled rectifier is coupled in parallel between the output terminal 52 and an output terminal 54 which is coupled to the junction 24 of the secondary winding arrangement 14.

As illustrated, the silicon controlled rectifiers 38 through 48 each include a control electrode 56 through 66, respectively. As is commonly known, a silicon controlled rectifier functions similar to a discharge tube such as a thyratron switch in that it is normally in a nonconducting or open state and may be caused to fire or close by a current signal applied to its control electrode. In accordance with the present invention, alternating current signals applied to the control electrodes cause the switching devices to fire in sequence at regular intervals to produce a three-phase full wave rectified current signal on the lead 50.

To provide the necessary current signals at the control electrodes, each control electrode is coupled through a resistor such as 68 to a coil of the secondary winding arrangement 16. As represented, by way of example, the secondary winding 16 includes three separate coil arrangements 70, 72 and 74. As illustrated, each coil is center-tapped at a common junction or neutral reference terminal represented at 76. Thus, in a manner similar to that regarding the secondary winding arrangement 14, a current signal ($\phi A''$) is developed in the portion of the winding 70 between the junction 76 and a terminal 78 which is in phase with the current signal $\phi A$ while a current signal ($-\phi A''$) is developed in the portion of the coil 70 between the junction 76 and a terminal 80 which is 180° out-of-phase with the signal $\phi A$. In a like manner a signal ($\phi B''$) is developed between the junction 76 and a terminal 82 of the coil 72 which is in phase with the signal $\phi B$ and a signal ($-B''$) is developed within the portion of coil 72 between the junction 76 and a terminal 84 which is 180° out of phase with the signal $\phi B$. Similarly, a signal ($\phi C''$) is developed in the portion of the coil 74 between the junction 76 and a terminal 86 which is in phase with the signal $\phi C$ while a current signal ($-\phi C''$) is developed in the portion of the coil between the junction 76 and a terminal 88 which is 180° out of phase with the signal $\phi C$.

As illustrated, each control electrode is coupled to one of the terminals of the secondary winding arrangement 16. In particular, the control electrodes are coupled to terminals associated with coils passing current signals which are 120° out of phase with the current signal flowing into the anode of the silicon-controlled rectifier associated therewith. Thus, for example, the control electrode 56 of the rectifier 38 is coupled to the terminal 82 of the coil 72—the portion of the coil 72 between the junction 76 and the terminal 82 passing a control current which is in phase with the signal $\phi B$, while the current signal passing from the secondary winding arrangement 14 to the anode of the rectifier 38 is in phase with the current signal $\phi A$ and hence 120° out of phase with the control current. In this manner, when the direct current level of the current signals passing into the anode and the control electrode of the controlled rectifier 38 are at the same level, to define a normal operating condition for the power supply, the silicon controlled rectifier 38 is fired at a 120° phase angle relative to its anode current.

In a like manner each of the remaining control electrodes are coupled to a terminal of the secondary winding arrangement 16 to cause the silicon controlled rectifiers to normally fire at a 120° phase angle relative to the current flowing in the anode circuit. Accordingly, a pulsating current signal is developed on the lead 50 which is filtered by a filter represented by a coil 90 and a capacitor 92 to produce a direct current signal flow through a resistor 94 coupled between the output terminals 52 and 54 to develop a regulated output voltage signal.

To provide continuous regulation of the magnitude of the output voltage means are included for comparing the output voltage with a reference voltage to develop an error voltage which in turn is applied to the common junction 76 to control the firing angle of the rectifiers and hence correct for variations in the output voltage. To develop the reference voltage, means are disposed between the output terminals 52 and 54 which by way of example include a resistor 96 coupled in series with a zener diode 98. Due to the operation of the zener diode 98 a fixed magnitude of voltage is maintained at a junction of the zener diode and the resistor.

To compare the reference voltage with the output voltage a differential amplifier 100 is coupled between the junction of the zener diode 98 and the resistor 96 and the movable contact arm 102 which is positioned along the resistor 94. When like magnitudes of voltage are applied to the differential amplifier 100 a zero output voltage signal is developed at an output terminal 104 which is coupled to the junction 74 of the secondary winding arrangement 16. However, if, due to variations in load conditions or in the three-phase alternating current source 12, the magnitude of the output voltage should begin to vary, a direct current voltage is immediately developed at the output terminal 104 which is directly proportional to the variation in the output voltage relative to the reference voltage. Since the output terminal 104 is coupled to the common junction 76 of the secondary winding arrangement 16 the direct current voltage signal produces a change in the voltage level of the junction 76. A change in the voltage level of the junction 76 in turn, causes a like change to occur in the common direct current level of the alternating current control signals passing through the coils of the secondary winding arrangement 16. Changes in the direct current level of the control signals in turn simultaneously produce a change in the firing angle of each of the switching devices to compensate for the variation in the output voltage level. This correction continues until the voltages applied to the differential amplifier 100 are again equal in magnitude.

In this manner a single closed loop error detector system is provided which simultaneously controls all three phases of the three-phase system to develop a direct current voltage having a substantially constant average value with varying load and source conditions.

The control operation of the error detector circuit is graphically represented for a single phase of the system in FIGURE 2. Only one phase of the system developing the current $\phi A$ is represented. As illustrated by the curve 106 the current signal $\phi A'$, in being applied to the anode of the silicon controlled rectifier 38, does not result in a firing thereof until the magnitude of the control signal $\phi B''$, represented by the curve 108, exceeds the direct current level of the signal $\phi A'$. Under normal conditions with the D.C. component of both the $\phi A'$ and $\phi B''$ signals equal to zero, this occurs at a 120° phase angle relative to the signal $\phi A'$. Thus normally during a portion of the cycle of the signal $\phi A'$ extending from 120° to 180°, the silicon controlled rectifier 38 is conducting. However, if changes occur in the magnitude of the output signal developed by the power supply to produce a voltage signal at the output 104 of the differential amplifier 100, the voltage level of the junction 76 is varied. In this manner, the common direct current level of the current signals passing through the coils of the secondary winding arrangement 16 to control the firing angle of the switching devices also varies. Accordingly, as illustrated in FIGURE 2, in response to a reduction in the magnitude of the output voltage, a signal is developed by the differential amplifier 100 causing the voltage level of the junction 76 to increase. This results in an increase in the direct current level of the signal $\phi B''$ as illustrated by the broken line 110, causing the reduction in the firing angle of the rectifier 38 and increasing the duration of conduction by the rectifier. Similarly, if an increase in the voltage level of the output signal occurs, the biasing level at the junction 76 is decreased to produce a reduction in the direct current level of the signal $\phi B''$ as represented by the dotted line curve 112. As illustrated, this results in an increase in the firing angle and reducing the duration of conduction to compensate for the increase in the output voltage magnitude.

The above operation, as illustrated in FIGURE 2, occurs for each discharge device thereby providing a three-phase, full wave regulated power supply having a single closed loop error detector system to maintain the average magnitude of the output voltage developed thereby.

Although the present invention has been specifically described in connection with a three-phase full wave system it is to be understood that since the novel power regulation is supplied by controlling the firing angle of electrical switching means in response to the D.C. level of control signals which are 120° out-of-phase with the signals being passed by the switching means, the power supply may be employed in any multiple of three-phase systems without departing from the scope of the present invention.

Further, although three-phase transformers have been employed by way of example in the detailed description of the power supply, it is to be understood that the term three-phase transformer arrangement includes all electrical equivalents of the term. Thus, the three-phase primary and three-phase secondary arrangements may include a plurality of single-phase or double-phase and single-phase windings to develop a three-phase or multiple of three-phase signal.

What is claimed is:

1. A power supply for developing a regulated direct current signal from a source of unregulated three-phase alternating current signals comprising, a transformer including a three-phase primary winding arrangement coupled to the source, a first three-phase secondary winding arrangement associated with the primary winding arrangement and having a reference terminal defining one output terminal for the power supply, a second three-phase secondary winding arrangement associated with the primary winding arrangement and having a reference terminal for receiving a signal to control the direct current level of current signals developed in the windings of the second three-phase secondary winding arrangement, a plurality of normally open electrical switching devices each being coupled in series between a winding of the first three-phase secondary winding arrangement and a common terminal defining a second output terminal for the power supply, each switching device including a control electrode for controlling the closing of the switching device, means for coupling each control electrode to a winding of the second three-phase secondary winding arrangement, means for developing a reference voltage, means for comparing the reference voltage with an output voltage developed between the output terminals to produce a signal proportional to any difference between the reference voltage and the output voltage, and means for applying the signal to the reference terminal of the second three-phase secondary winding arrangement to control the direct current level of current signals developed in the windings of the second three-phase secondary winding arrangement thereby simultaneously controlling the closing of each switching device to correct for any variation in the output voltage relative to the reference voltage.

2. The apparatus defined in claim 1 wherein the control electrode of each switching device is coupled to a winding of the second three-phase secondary winding arrangement which conducts a current that is 120° out of phase with a current in the winding of the first three-phase secondary winding arrangement coupled to the switching device.

3. The apparatus defined in claim 2 wherein the second three-phase secondary winding arrangement is a Y-shaped winding arrangement having a common winding connection point as its reference terminal.

4. A power supply for developing a regulated direct current signal from a source of unregulated three-phase alternating current signals comprising, a three-phase transformer including a three-phase primary winding arrangement coupled to the source of three-phase alternating current signals, a first three-phase secondary winding arrangement associated with the primary winding arrangement and having a reference terminal defining one output terminal for the power supply, a second three-phase secondary winding arrangement associated wth the primary winding arrangement and having a common winding connection point, a plurality of normally open electrical switching devices each having an anode coupled to a winding of the first three-phase secondary winding arrangement, a cathode coupled to a terminal defining a second output terminal for the power supply, and a control electrode coupled to a winding of the second three-phase secondary winding arrangement for controlling the closing of each switching device, means for developing a reference voltage, means for comparing the reference voltage with an output voltage developed between the output terminals to develop a signal proportional to any difference between the reference voltage and the output voltage, and means for applying the signal to the common winding connection point of the second three-phase secondary winding arrangement to control the bias level of signals applied to the control electrodes of the switching devices for correcting for any variations in the output voltage relative to the reference voltage.

5. A regulated power supply comprising: a source of unregulated three-phase alternating current signals; a transformer including a three-phase primary winding arrangement coupled to the source of three-phase alternating current signals, a first three-phase secondary winding arrangement associated with the primary winding arrangement and having a reference terminal defining one output terminal for the power supply, a second three-phase secondary winding arrangement associated with the primary winding arrangement, and having a common winding connection point; a plurality of normally open electrical switching devices each having an anode coupled to a winding of the first three-phase secondary winding arrangement, a cathode coupled to a terminal defining a second output terminal for the power supply, and each switching device having a control electrode coupled to a winding of the second three-phase secondary winding arrangement which conducts a current that is 120° out of phase with a current flowing in the winding of the first three-phase secondary winding which is coupled to its anode for controlling the closing of each switching device to produce a direct current voltage between the output terminals; means coupled between the output terminals for developing a reference voltage; means for comparing the reference voltage with the output voltage to produce a direct current signal proportional to any difference between the reference voltage and the output voltage; and means for applying the direct current signal to the common point of the second three-phase secondary winding arrangement to control the direct current bias level of signals applied to the control electrodes of the switching devices thereby correcting for any variation in the output voltage relative to the reference voltage.

6. A power supply for developing a regulated direct voltage from a three-phase alternating current system comprising in combination with a source of unregulated three-phase alternating current signals a transformer including a three-phase primary winding arrangement coupled to the source, a first three-phase secondary winding arrangement having first, second and third secondary coils, each secondary coil of the first three-phase secondary arrangement being center-tapped at a common junction which defines a first output terminal for the power supply, and a second three-phase secondary winding arrangement including first, second and third secondary coils, each secondary coil of the second three-phase secondary arrangement being center-tapped at a common junction, a plurality of normally open electrical switching devices coupled in parallel, each device being coupled between a terminal of a coil of the first three-phase secondary arrangement and a common terminal defining a second output terminal for the power supply and each having a control electrode coupled to a terminal of a coil of the second three-phase secondary arrangement which passes a current that is 120° out of phase with a current passing through the coil of the first three-phase secondary arrangement to which it is coupled for controlling the closing of each switching device, a low pass filter coupled between the output terminals to shunt the parallel connected switching devices, means coupled between the output terminals for developing a reference voltage, means for comparing the reference voltage with an output voltage developed between the output terminals to produce a direct current signal proportional to any difference between the reference voltage and the output voltage, and means for applying a direct current signal to the common junction of the second three-phase secondary winding arrangement to control the direct current level of current signals developed in the second three-phase secondary arrangement thereby simultaneously controlling the closing of the switching devices to correct for any variation in the output voltage relative to the reference voltage.

7. In a regulated power supply having means for developing a plurality of current signals each corresponding in phase to a current signal developed by a multiple of three-phase signal source and means for applying each current signal to a normally open electrical switching means, each switching means including a control electrode for controlling the closing thereof and being coupled to an output means for developing an output voltage signal, the combination of: means including a plurality of electrical windings having a common connection point for developing a current signal in each winding which is in phase with a current signal of the plurality of current signals; means for coupling the control electrodes of each switching means to a winding which conducts a current that is 120° out-of-phase with the current signal applied to the switching means; means coupled to the output means for developing a reference voltage signal; means for comparing the reference voltage signal with the output voltage signal to develop a direct current error voltage signal which is proportional to any variations in the output voltage signal relative to the reference voltage signal; and means for applying the error signal to the common winding connection point to control the direct current bias level of the current signals applied to the control electrodes of the switching means and thereby regulate the closing of the switching means.

8. A regulated power supply comprising: a three-phase alternating current signal source; means coupled to the source for developing a multiple of three-phase current signals; means coupled to the source including a plurality of windings having a common winding connection point for developing a current signal in each winding which is in phase with a multiple of three-phase current signal; a plurality of normally open electrical switching means each having a control electrode for controlling the closing of the switching means; means for applying a multiple of three-phase current signal to each switching means; means for coupling the control electrode of each switching means to a winding which conducts a current signal that is 120° out-of-phase with the multiple of three-phase current signal applied to the switching means; means for coupling each switching means to an output means for developing an output voltage signal; means for developing a reference voltage signal; means for comparing the reference voltage signal with the output voltage signal to produce a direct current signal proportional to any variations in the output voltage signal relative to the reference voltage signal; and means for applying a direct current signal to the common winding point to control the direct current bias level of the current signals applied to the control electrodes of the switching means thereby correcting for any variations in the output voltage relative to the reference voltage.

References Cited in the file of this patent

UNITED STATES PATENTS

| | | |
|---|---|---|
| 2,673,953 | Wittenberg | Mar. 30, 1954 |
| 3,005,147 | Thomas | Oct. 17, 1961 |
| 3,020,448 | Fefer | Feb. 6, 1962 |